US005853875A

United States Patent [19]

Toshida et al.

[11] Patent Number: 5,853,875

[45] Date of Patent: Dec. 29, 1998

[54] LIGHT-TRANSMITTING RECORDING MATERIAL FOR ELECTROPHOTOGRAPHY, AND HEAT FIXING METHOD

[75] Inventors: Yomishi Toshida, Yokohama; Naoki Kushida, Hachiohji; Takehiko Ooi, Yokohama; Hiroyuki Ogino, Tokyo, all of Japan

[73] Assignee: Canon Kabushiki Kaisha, Tokyo, Japan

[21] Appl. No.: 827,468

[22] Filed: Mar. 28, 1997

[30] Foreign Application Priority Data

Mar. 29, 1996 [JP] Japan .................................... 8-076530
Feb. 28, 1997 [JP] Japan .................................... 9-045659

[51] Int. Cl.$^{6}$ .............................. B32B 7/12; G03G 13/20

[52] U.S. Cl. ............................ 428/349; 428/354; 430/99

[58] Field of Search .................................... 428/342, 195, 428/208, 323, 339, 349, 354; 430/63, 66, 99

[56] References Cited

U.S. PATENT DOCUMENTS

| | | | |
|---|---|---|---|
| 4,015,043 | 3/1977 | Watanabe et al. | 428/342 |
| 5,411,787 | 5/1995 | Kulkarni et al. | 428/195 |

FOREIGN PATENT DOCUMENTS

| | | |
|---|---|---|
| 61-273554 | 12/1986 | Japan . |
| 62-238576 | 10/1987 | Japan . |
| 1-263085 | 10/1989 | Japan . |
| 2-263642 | 10/1990 | Japan . |
| 5-181300 | 7/1993 | Japan . |
| 6-1180 | 1/1994 | Japan . |
| 6-19180 | 1/1994 | Japan . |
| 6-194858 | 7/1994 | Japan . |
| 6-332221 | 12/1994 | Japan . |
| 7-199515 | 8/1995 | Japan . |

*Primary Examiner*—John Goodrow
*Attorney, Agent, or Firm*—Fitzpatrick, Cella, Harper & Scinto

[57] ABSTRACT

A light-transmitting recording material for electrophotography has a light-transmitting base material, a conductive undercoat layer formed on the light-transmitting base material, and a light-transmitting toner acceptable layer formed on the conductive undercoat layer. The surface resistivity of the conductive undercoat layer ranges from $1\times10^{7}\Omega$ to $1\times10^{10}\Omega$ at 20° C. and 60% relative humidity. The conductive undercoat layer contains a metallic conductive or semiconductive material, and the light-transmitting toner acceptable layer includes a wax as a releasing agent and a thermoplastic resin. Also, a heat fixing method is provided in which a toner image is formed and heat-fixed on the above-mentioned light-transmitting recording material.

34 Claims, 3 Drawing Sheets

LIGHT-TRANSMITTING RECORDING MATERIAL FOR ELECTROPHOTOGRAPHY, AND HEAT FIXING METHOD

BACKGROUND OF THE INVENTION

FIELD OF THE INVENTION AND RELATED ART

The present invention relates to an electrophotographic light-transmitting recording material for forming a toner image thereon and a heat fixing method for forming a toner image on the recording material.

In typical full-color toner image forming processes, a photosensitive material on a photosensitive drum is uniformly charged with a primary charging assembly, an image is exposed on the photosensitive material with a laser light beam modulated by magenta image signals of the original to form an electrostatic latent image, the electrostatic latent image is developed with a magenta developing assembly to form a magenta toner image, and the magenta toner image developed on the photosensitive drum is transferred to a recording material with a transfer charging assembly. After developing and transferring the magenta image, the photosensitive drum is de-electrified with a de-electrifying charging assembly and cleaned. The photosensitive drum is charged with the primary charging assembly again to form a cyan toner image on the photosensitive drum as set forth above, and the cyan toner image is transferred to the recording material on which the magenta toner image has been transferred. Then, a yellow image and a black image are separately transferred to the recording material. As a result, four color images are transferred to the recording material. A full-color image is formed by fixing the four color images on the recording material with a fixing means by means of heat and pressure.

In recent years, such image forming apparatuses are used not only as copying machines for office work to make copies of originals, but also in the fields of computer printers and personal copying. In addition to use as laser beam printers, the basic assemblies of the apparatus have also been applied to plain-paper facsimile machines. More compact, lightweight and highly reliable image forming apparatuses which can provide higher quality images at higher processing speeds have been demanded. Thus, such apparatuses are composed of simpler components in various respects. As a result, toners are also required to be of higher quality. Providing superior apparatuses can no longer be accomplished unless toner performance improves.

With a need for variety in copying, demand for color copying rapidly has increased. In order to more faithfully copy original color images, higher quality and resolution are required for color copying. The toners used in color image formation must exhibit excellent melting characteristics and color mixing characteristics when heat is applied, and have higher sharp-melt characteristics having lower softening points and lower melting points. The use of toners with higher sharp-melt characteristics is can expand the color reproducibility range of the copy and can produce a color copy faithful to the original.

However, such a toner having higher sharp-melt characteristics has generally a high affinity for the fixing roller and readily offsets to the fixing roller. In particular, in the case of a fixing means in a color image forming apparatus, the trend to offset is further increased due to an increased thickness of a plurality of toner layers, i.e., magenta, cyan, yellow and black toner layers, formed on the recording material.

As a means to improve releasability of the toners from the fixing roller, the surface of the fixing rollers is formed from a material having excellent releasability, e.g. a silicone rubber or a fluorine resin, in respect of toners, and the surface is further coated with a liquid having high releasability, such as silicone oil and fluorine oil, in order to prevent the offset and fatigue of the roller surface. Although this method is extremely effective, the fixing means must be provided with a unit for supplying the liquid to prevent the offset. Further, the applied oil causes interlayer peeling of the fixing rollers, resulting in a shorter life of the fixing roller.

With a variety of recent copying needs, various types of paper, coated paper and plastic films are used as recording materials. In particular, a need for transparency sheets (or OHP sheet) used for overhead projectors (OHP) has attracted attention. Since the transparency sheets, unlike paper, have low oil absorbency, the oil used in the fixing means adheres to the recording material surface. As a result, after image formation, the transparency sheets are sticky with the coated oil, resulting in decreased image quality. Further, the releasing oil such as silicone oil will contaminate the machine by thermal evaporation, and cause problems relating to oil recovery and disposal.

Accordingly, establishment of a fixing system not requiring oil coating during the image fixing step and development of a novel toner for achieving such a fixing system are strongly demanded for solving the problems set forth above.

Japanese Patent Application Laid-Open No. 61-273554 discloses a toner containing a releasing agent such as wax to cope with this problem. The heat conductivity of the toner improves due to the wax which is present in the toner and melted at a low temperature. Thus, the toner allows low temperature fixing. Further, since the wax melted during fixing preferably acts as a releasing agent, high temperature offset can be prevented without applying another releasing agent such as oil to the fixing roller.

When a color image, e.g. a mono-color or full-color toner image, is formed on a transparency sheet by an electrophotographic system with a dry development process, the entire image projected with an OHP has a grayish tonality and thus narrow reproducibility in tonality. Nevertheless the color image on the transparency sheet has satisfactory color formation. Such a phenomenon is caused by unfixed toner image on the smooth transparency sheet in which the toner is not sufficiently melted during heat-fixing. Since such unfixed toner image is particulate it scatters incident light and forms shadows on the screen. In particular, in halftone areas and highlight areas having a low image density, the absorption ascribable to a dye and/or pigment in the toner becomes lower because of a decreases in the number of toner particles, so that a phenomenon may occur in which the color tone to be reproduced is grayish.

On the other hand, when a toner image formed on a recording material such as plain paper is visually observed, such particulate toners affect the image quality less because the observed image is an image achieved by reflection of the light irradiated on the fixed toner image. However, when the toner image is observed or projected on a screen by transmitted light, as with OHPs, transparency deteriorates due to light scattering by means of the remaining particulate toners and the tonality becomes grayish. Accordingly, recording materials used in OHPs require a decrease in particulate toners after color image fixing and an improvement in transparency.

Various light-transmitting recording materials for electrophotography, which have a toner receiving layer comprising a thermoplastic resin, e.g. a styrene-acrylic resin or a polyester resin, provided on a transparent base sheet, have been proposed in view of the improved clearness due to improvement in the toner fixing performance and the improved transport performance and blocking resistance. For example, Japanese Patent Application Laid-Open Nos. 1-263085, 6-1,180, 6-194858 and 6-332221 disclose such recording materials. Further, Japanese Patent Application Laid-Open Nos. 2-263642 and 7-199515 disclose a means for decreasing particulate toners after fixing and increasing transparency by means of embedding the toner particles into the toner receiving layer with heat and pressure during fixing. In such light-transmitting recording materials, particulate characteristics of toners after fixing are improved by a resin component in the toner receiving layer, light transparency is improved, and excellent projection performance is achieved with OHPs. However, when a resin, which is sufficiently plasticized by heat and pressure during fixing, is used in a toner receiving layer, toner particles are barely embedded in the toner receiving layer and the entire projected image exhibits grayish tonality.

The toner receiving layer is generally adjusted to have a surface resistivity ranging, for example, from $1\times10^{8}\Omega$ to $10^{13}\Omega$ in order to improve toner transferring characteristics. Low molecular weight organic compounds and conductive resins which are generally used are significantly affected by the environment, in particular, humidity. At low humidity, the electrical resistance increases to an extent that the toners are not transferred or image transferring characteristics deteriorate. Japanese Patent Application Laid-Open No. 62-238576 discloses a sheet material on which a conductive undercoat layer and an image receiving layer thereon are coated. Japanese Patent Application Laid-Open No. 6-19180 discloses a conductive undercoat layer in which conductive metal oxide particles are dispersed in a binder. Such configurations can decrease the above-mentioned environmental effects. When a low molecular weight organic compound or a conductive resin is, however, used for an undercoat layer, the undercoat layer is easily damaged during the coating of an image receiving layer, and thus the resistance is too high or unstable to use. When metal oxide fine particles are used, transparency deteriorates compared to the organic antistatic agent and haze tends to occur.

In each recording material set forth above, a releasing agent such as oil is applied on the fixing roller for fixing the toner image. In the OHP sheet set forth above, an oil-free fixing process is not taken into account in which a releasing wax is contained in the toner, and thus no releasing agent including oil is applied to the fixing roller. Thus, if the toner set forth above is used and if an image having a low toner ratio, and particularly an image area ratio of approximately 5%, is heat-fixed, the wax does not sufficiently act as a releasing agent at a portion in which no toner image is formed over a wide range, although excellent offset resistance is achieved at a toner image portion. Thus, the toner receiving layer comprising the thermoplastic resin easily adheres to the fixing roller. Accordingly, a recording material suitable for the oil-free fixing process using the toner set forth above and having environmental stability, is eagerly awaited.

Japanese Unexamined Patent Publication No 5-181,300 discloses an oil-free fixing process with heat in which toners containing wax components are fixed on a transparent recording material by a fixing roller on which no releasing agent such as oil is applied. However, the prior art does not disclose fixing a toner image having a small image area ratio of 5% or less.

SUMMARY OF THE INVENTION

It is an object of the present invention to provide a light-transmitting recording material for electrophotography and a heat fixing method using the same which solve the drawbacks set forth above.

It is another object of the present invention to provide a light-transmitting recording material for electrophotography and a heat fixing method using the same, in which an image projected from an OHP is not grayish in halftone areas, a mono-color or full-color image is obtainable with excellent color reproducibility, and a high quality mono-color or full-color transparent sheet having excellent environmental stability and transmittance is obtainable.

It is a further object of the present invention to provide a light-transmitting recording material for electrophotography and a heat fixing method using the same, in which the light-transmitting recording material has a toner receiving layer which does not adhere to the surface of an oil-free fixing means, when a toner image formed with toner containing wax is fixed to the light-transmitting recording material.

In accordance with the present invention, a light-transmitting recording material for electrophotography comprises: a light-transmitting base material, a conductive undercoat layer formed on the light-transmitting base material, and a light-transmitting toner acceptable layer formed on the conductive undercoat layer; wherein surface resistivity of the conductive undercoat layer ranges from $1\times10^{7}\Omega$ to $1\times10^{10}\Omega$ at 20° C. and 60% relative humidity, the conductive undercoat layer contains a metallic conductive or semiconductive material, and the light-transmitting toner acceptable layer comprises a wax as a releasing agent and a thermoplastic resin.

In accordance with a second aspect of the present invention, a heat fixing method comprises:

- forming a toner image on a light-transmitting recording material, and
- heat-fixing the toner image to the light-transmitting recording material by a heat fixing means; wherein
  - the light-transmitting recording material comprises a light-transmitting base material, a conductive undercoat layer formed on the light-transmitting base material, and a light-transmitting toner acceptable layer formed on the conductive undercoat layer; the surface resistivity of the conductive undercoat layer ranges from $1\times10^{7}\Omega$ to $1\times10^{10}\Omega$ at 20° C. and 60% relative humidity, the conductive undercoat layer contains a metallic conductive or semiconductive material, and the light-transmitting toner acceptable layer comprises a wax as a releasing agent and a thermoplastic resin.

DETAILED DESCRIPTION OF THE PREFERRED EMBODIMENTS

Figure 1:
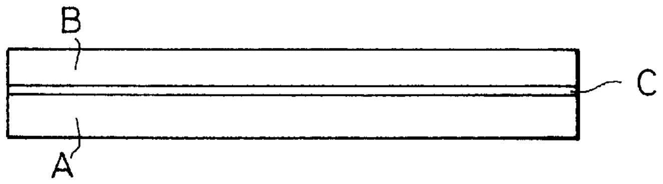
FIG. 1 is a cross-sectional view illustrating a configuration of a light-transmitting recording material for electrophotography in accordance with the present invention.

The present inventors have found as a result of intensive investigations a way to solve the drawbacks set forth above in that a light-transmitting recording material is smoothly discharged and the fixing performance of the toner image is not adversely affected by forming a toner receiving layer of the light-transmitting recording material with a mixture essentially consisting of a thermoplastic resin and wax, when a toner image having a low toner image area ratio is heat-fixed to the light-transmitting recording material by means of an oil-free fixing process. However, a new problem has been uncovered. In detail, when the light-transmitting recording material containing wax in the toner receiving layer is subjected to electrostatic transfer, in which a transfer bias is applied during toner image transfer to generate an electrostatic force in a low relative humidity environment, the light-transmitting recording material will be charged, and thus the toners will not be uniformly transferred (so called "irregular discharge phenomenon")

The present inventors have further investigated solving the irregular discharge phenomenon in a low relative humidity environment and found that when a conductive undercoat layer containing a conductive or semiconductive material of a metal or a metallic compound and having a specified surface resistivity is formed between a light-transmitting base material and a toner receiving layer, the surface resistivity of a recording material provided with the toner receiving layer is appropriately adjustable, and decreased transmittance and haze of the light-transmitting recording material can be suppressed. Further, a wax releasing agent in the toner receiving layer does not inhibit discharge of the light-transmitting recording material from a fixing apparatus. The present invention has been accomplished based on the knowledge set forth above.

The light-transmitting recording material for electrophotography in accordance with the present invention exhibits the following advantages: The light-transmitting recording material can be smoothly discharged from a heat fixing means without adhesion to the surface of the heat fixing means, even when a very small amount of oil or no oil is fed to the fixing means. The resulting image is not grayish but is clear and high quality. Further, irregular electric discharge does not occur under a low relative humidity environment.

In a known method of controlling the surface resistivity of the light-transmitting recording material, a conductive layer containing an electrically conductive material is formed on a toner receiving layer. In this method, since the surface of the toner receiving layer is covered with the conductive layer, the wax releasing agent in the toner receiving layer is prevented from releasing the light-transmitting recording material from the heat fixing means. Thus, this method is not applicable to a fixing means operating at a high fixing speed. When inorganic fine particle powder such as metal powder is used as the conductive material, the inorganic fine particles in the conductive layer formed on the toner receiving layer cause irregular reflection of incident light and thus increase haze, resulting in a decrease in the quality of the OHP image due to low light transmittance. On the other hand, when a conductive layer using an organic conductive material such as a quaternary ammonium salt is formed between the light-transmitting base material and the toner receiving layer, the conductive layer is dissolved with a coating solution to form the toner receiving layer, resulting in deterioration of the conductive layer.

In contrast, in a light-transmitting recording material in accordance with the present invention, a conductive undercoat layer containing a conductive or semiconductive material of metal or a metallic compound is formed between a light-transmitting base material and a toner receiving layer. The toner receiving layer formed on the conductive undercoat layer can suppress irregular reflection of incident light and haze. Further, since the metallic conductive or semiconductive material is not dissolved in a coating solution to form the toner receiving layer, the light-transmitting recording material exhibits excellent conductivity.

An embodiment of a light-transmitting recording material in accordance with the present invention will now be illustrated with reference to FIG. 1. The light-transmitting recording material in FIG. 1 comprises a light-transmitting resin base sheet (film) A as a base material, a light-transmitting toner receiving layer B and a conductive undercoat layer C. The resin base sheet A must be heat resistant such that the sheet is not significantly deformed by heat during heat-fixing with or without pressure. It is preferred that the base sheet A used in accordance with the present invention have a thermal deformation temperature of at least about 145° C. and more preferably at least about 150° C. under a measuring condition of 4.6 kg/cm$^2$ described in ASTM D642. Further, the base sheet A preferably has a heat resistance of at least about 100° C. as a maximum service temperature. Examples of such resins include polyethylene terephthalate (PET), polyethylene naphthalate (PEN), polyamide and polyimide resins. Among them, polyethylene terephthalate is preferred in view of heat resistance and transparency.

The base sheet A formed of the material set forth above must have a thickness sufficient not to form wrinkles when the sheet is softened by the heat during the image fixing step. For example, a polyethylene terephthalate base sheet may have a thickness at least about 50 $\mu$m. Transparency decreases with thickness of the base sheet A but even so, it is preferred that the base sheet A have a thickness of 50 to 300 $\mu$m, more preferably 70 to 200 $\mu$m and the most preferably 100 to 150 $\mu$m, while maintaining excellent transparency.

The conductive undercoat layer C is formed on the light-transmitting base material A set forth above in the light-transmitting recording material in accordance with the present invention. It is preferred that the conductive undercoat layer C be formed by applying a dispersion in which an antistatic agent set forth below is dispersed in a dispersion medium, such as an organic solvent or water. Typical examples of organic solvents include alcohols.

Examples of usable antistatic agent in the present invention include metallic conductive or semiconductive materials such as metals and metallic compounds, e.g. Sn, Sb, In, Ag, Zn, Ti, oxides thereof and metal doped oxides such as Sn-doped $In_2O_3$ and Sb-doped SnO. In the conductive undercoat layer C, the metal or metal oxide fine particles set forth above are dispersed with a binding resin such as a polyester or acrylic resin.

The metal or metal oxide fine particles preferably have an average particle size at least about 0.3 $\mu$m to suppress light scattering. The average particle size in the present invention is determined as follows: A dispersion containing approximately 4 percent by weight of a solid component is dropped onto a specimen grid and dried. The specimen was observed with a transmission electron microscope H-7100 FA (made by Hitachi, Ltd.) at an accelerated voltage of 100 kV and maximum magnification so that at least 200 fine particles can be observed in an observation field. The length and breadth of each particle was calculated and (length+breadth)/2 was set as the particle size. The average particle size was determined from 200 particles.

In the present invention, because the conductive layer C is adjusted so as to have a surface resistivity and be covered with the toner receiving layer B, haze due to the conductive layer C can be suppressed and transparency can be maintained at a practical level.

The conductive undercoat layer C is formed on the light-transmitting base material so that the surface resistivity at 20° C. and 60% relative humidity (RH) preferably ranges from $1\times10^7\Omega$ to $1\times10^{10}\Omega$, and more preferably from $1\times10^7\Omega$ to $5\times10^9\Omega$. A surface resistivity lower than $1\times10^7\Omega$ indicates an excessive metallic conductive material content in the conductive undercoat layer. Thus, transparency decreases due to increased haze in the conductive undercoat layer. Transparency cannot be improved to a practical level by the toner receiving layer. On the other hand, when the surface resistivity of the conductive undercoat layer is larger than $1\times10^{10}\Omega$, the thickness of the toner receiving layer must be extremely thin in order to adjust the surface resistivity of the light-transmitting recording material to an appropriate level suitable for toner transfer. Thus the toner receiving layer does not have a thickness set forth below which is sufficient to embed the toners, resulting in decreased image projection ability.

When a surface resistivity of the conductive undercoat layer C is controlled to within the range set forth above, the surface resistivity of the recording material with the toner receiving layer can be controlled to within a range of $10^8\Omega$ to $10^{13}\Omega$, as long as the toner receiving layer B has a thickness set forth below. Since the surface resistivity of the recording material is little affected by thickness, it can be readily controlled. This suggests the shielding effect of the insulating toner receiving layer B does not depend on the thickness of the toner receiving layer by controlling the surface resistivity of the conductive undercoat layer C to within the range set forth above.

The control of the surface resistivity of the conductive undercoat layer C is performed as follows, for example: Using a material having a proper resistance, a dispersion having a solid component concentration of approximately 1 to 10 percent by weight is prepared and applied with a #5 wire bar or less.

The surface resistivity in accordance with the present invention is determined based on JIS K6911 using a R8340A and R12702 made by Advantest Corporation at 20° C., 60% relative humidity (RH) and 100 V.

The toner receiving layer B may be formed by, for example, applying a coating solution using an organic solvent not affecting the conductive undercoat layer, or an aqueous coating dispersion onto the transparent base sheet by means of a coating process, such as a bar-coat process, dipping process or spraying process, and drying at room temperature or with heat.

In order to improve adhesion between the heat-resistance resin sheet, the conductive undercoat layer C and the toner receiving layer B, these surfaces may be treated by plasma or corona discharge or provided with adhesive layers.

Examples of resins usable as adhesive layers in accordance with the present invention include polyester resins, acrylic ester resins, methacrylic ester resins, and styrene-acrylic ester copolymers. These resins exhibit high adhesiveness.

Materials for the toner receiving layer in accordance with the present invention will now be illustrated.

Non-limiting examples of resins usable for the light-transmitting toner receiving layer B include thermoplastic resins, such as polyester resins, polymethyl methacrylate resins, styrene resins, styrene-acrylic resins, epoxy resins, vinyl acetate resins, vinyl chloride resins and polyurethane resins. These resins may be crosslinked using suitable crosslinking agents.

The number average molecular weight of the thermoplastic resin preferably ranges from 3,000 to 500,000 and more preferably 5,000 to 200,000. When using a thermoplastic resin having a number average molecular weight of less than 3,000, the thermoplastic resin tends to adhere to the surface of the heat fixing means. On the other hand, when the number average molecular weight is larger than 500,000, the toner receiving layer is not sufficiently softened during heat-fixing, and thus the toner particles are embedded in the toner receiving layer surface. Thus, the toner particulate characteristics and image quality deteriorate. Further, viscosity of the coating solution used for surface layer formation increases and thus deteriorates the coating performance of the solution or workability.

The number average molecular weight of the thermoplastic resin was determined by GPC (gel permeation chromatography). The GPC measurement in accordance with the present invention was performed with a GPC-150C made by Waters Ltd as follows: A series of columns were stabilized in a heat chamber at 40° C., A THF (tetrahydrofran) solvent was fed to the columns at a rate of 1 ml/min., and 50 to 200 $\mu$l of a resin in THF solution (0.05 to 0.6 wt %) was injected. The molecular weight of the resin was determined from the GPC curve indicating the molecular weight distribution using a calibration curve which was made using mono-dispersion polystyrene standard samples. The polystyrene standard samples used in the present invention were made by Tosoh Corporation and have number average molecular weights of $6\times10^2$, $1\times10^3$, $4\times10^3$, $1.75\times10^4$, $5.1\times10^4$, $1.1\times10^5$, $3.9\times10^5$, $8.6\times10^5$, $2\times10^6$, and $4.48\times10^6$, respectively. The detector employed is a RI (refractive index) type, and the column combination include TSK gel G1000H, G2000H and G3000H.

The thermoplastic resin usable in the present invention has a glass transition temperature (Tg) by DSC (differential scanning calorimetry) ranging from −10° to 80° C., preferably 0° to 70° C. and more preferably 10° to 70° C. When the glass transition temperature of the thermoplastic resin is lower than −10° C., the thermoplastic resin tends to adhere to the fixing roller or blocking of the thermoplastic resin occurs. On the other hand, when the glass transition temperature of the thermoplastic resin is higher than 80° C., the toner receiving layer is not sufficiently softened during fixing, and the toner particles will embed into the surface layer while still particulate.

The differential scanning calorimeter used in measurement of the glass transition temperature (Tg) is an internal heating input compensation type capable of high precision measurement. A typical example of differential scanning calorimeters usable in the present invention is a DSC-7 made by Perkin Elmer Inc. Measurement is based on ASTM D3418-82. In the present invention, a weighed thermoplastic resin sample is placed into an aluminum pan in an amount of 5 to 20 mg, and preferably 10 mg, and heated at a heating rate of 10° C./min. with an empty reference pan in a nitrogen stream over a temperature range from −100° C. to 200° C. Two base lines before and after the base line shift of the resulting thermogram indicating glass transition are extrapolated to each other, and the intersection of the thermogram with a line placed in the middle of the two base lines is set as the glass transition temperature.

The light-transmitting toner receiving layer B of the light-transmitting recording material in accordance with the present invention is essentially composed of a thermoplastic resin set forth above and a wax as a releasing agent.

Examples of usable waxes as releasing agents in the present invention include vegetable waxes such as carnauba wax, candelilla wax, rice wax and Japan wax, and derivatives thereof; mineral waxes such as ceresine wax and montan wax, and derivatives thereof such as acid wax, ester wax and partially saponified esterified wax; animal waxes such as beeswax, spermaceti and lanolin, and derivatives thereof; petroleum waxes such as paraffin wax and microcrystalline wax, and derivatives thereof; synthetic waxes such as polyethylene wax and Fischer-Tropsch wax, and derivatives thereof; higher fatty acids having carbon atoms of 12 or more such as lauric acid, myristic acid, palmitic acid, stearic acid and behenic acid; higher alcohols having carbon atoms of 12 or more such as stearyl alcohol and behenyl alcohol; esters such as fatty acid esters of saccharide and fatty acid esters of sorbitan; and amides such as oleyl amide. As used herein, "derivatives of waxes" means waxes which have polar groups, such as hydroxyl groups, carboxyl groups, alkyl ether groups, ester groups, and sulfonyl groups.

The preferable thickness of the toner receiving layer comprising the materials set forth above varies with the fixed toner particle size, and ranges from 1 to 30 μm and more preferably 2 to 15 μm. The most preferable thickness is also limited by transmittance of the sheet and image blur. A thickness over 30 μm results in curling of the recording material and an increase in the material cost.

Because the conductive undercoat layer C may have an extremely low thickness of several hundred nm which cannot be determined with a general coating thickness tester, the layer thickness formed on the light-transmitting base member A is substantially the same as the thickness of the toner receiving layer B.

Because fine wax particles uniformly disperse in the resin of the toner receiving layer and may be partially exposed on the surface, they are melted when passed through a heat fixing means and exhibit releasing effects. The wax is generally added in an amount of 0.01 to 30 percent by weight, preferably 0.1 to 30 percent by weight and more preferably 0.5 to 30 percent by weight based on the entire weight of the toner receiving layer B. When the wax content is less than 0.01 percent by weight in the toner receiving layer, releasability is not sufficiently achieved. On the other hand, a wax content of over 30 percent by weight decreases transparency due to wax precipitation.

The wax usable in the present invention has a melting point ranging from 40° to 120° C., and preferably 50° to 120° C. When the melting point of the wax is lower than 40° C., blocking readily occurs during preservation of the OHP sheet. When the melting point of the wax is higher than 120° C., satisfactory releasability of the wax is not achieved. Further, fusion of the melted toner with the surface of the toner receiving layer B during the fixing process is insufficient and irregular reflection occurs at their boundaries. As a result, the image quality on the light-transmitting recording material decreases.

Figure 4:
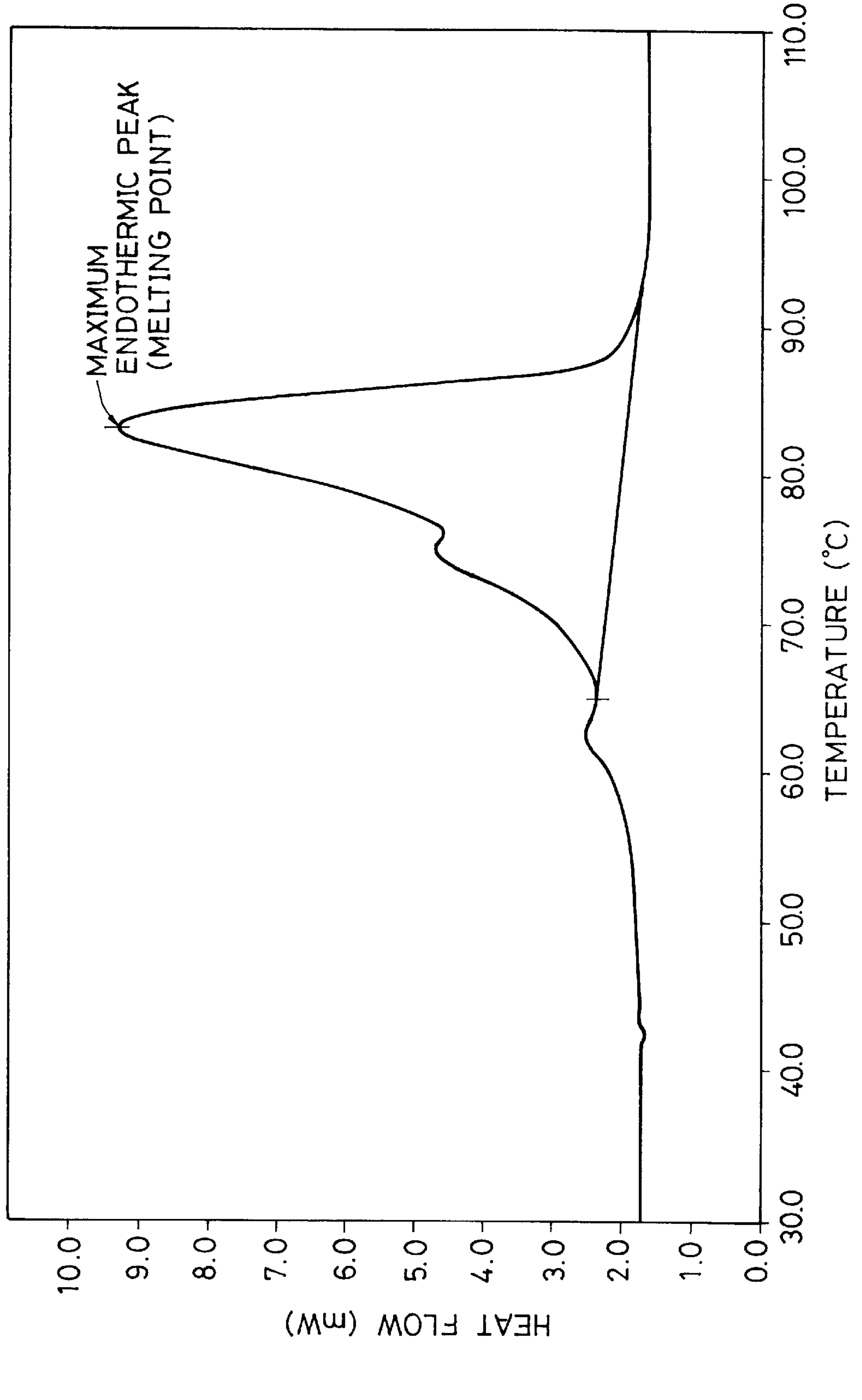
FIG. 4 is a DSC thermogram of wax used in Example 1 in accordance with the present invention.

In the present invention, the melting point of the wax is determined with a DSC, i.e., DSC-7 made by Perkin Elmer Inc., based on ASTM D-3418-82. The sample is heated once to record the sample history, cooled at a cooling rate of 10° C. and heated again at a heating rate of 10° C. to record a thermogram. The maximum point of the DSC endothermic curve ranging from −100° C. to 200° C. is set to a melting point as shown in FIG. 4.

In the combination of the wax with the thermoplastic resin, it is preferred that the wax be present as dispersed fine particles in the toner receiving layer and do not deteriorate transparency of the recording material. Thus, the wax used in the present invention generally has an average dispersion diameter of about 1.00 μm, preferably 0.01 μm to less than 1.00 μm and more preferably 0.04 μm to 0.5 μm, in the toner receiving layer. When the average dispersion diameter of the wax is greater than about 1.00 μm in the toner receiving layer, the toner receiving layer loses its transparency. Although the wax may be completely dissolved into the thermoplastic resin of the toner receiving layer, releasability of the wax can be more effectively achieved when the wax is dispersed in the toner receiving layer as particles having an average dispersion diameter of 0.01 μm or more.

The average dispersion diameter of the wax in the toner receiving layer in the present invention is determined as follows: A cross-section specimen of the toner receiving layer of the light-transmitting recording material is prepared with an ultrathin microtome and is stained with $RuO_4$. The specimen is subjected to observation with a transmission electron microscope H-7100FA made by Hitachi Ltd. at an acceleration voltage of 100 kV and a magnification so that at least 200 dispersion particles can be observed. The length and breadth of each particle are observed and the dispersion diameter is calculated as (length+breadth)/2. The average dispersion diameter is calculated from 200 particles.

In order that the wax be present in the toner receiving layer as fine particles with an average particle diameter of no greater than 1 μm, it is preferred that a coating solution, which contains wax having an average dispersion diameter of less than 1.00 μm, be prepared, applied to the light-transmitting base material and dried to form the toner receiving layer. Further, it is preferred that the temperature for forming the toner receiving layer be above the glass transition temperature (Tg) of the thermoplastic resin used and be within a range ±40° C. from the melting point of the wax.

The wax used in the present invention is barely soluble to organic solvents, in general, and particularly at room temperature. Thus, a preferred process to form the toner receiving layer B provides that once an aqueous dispersion is prepared and mixed with an aqueous dispersion of the thermoplastic resin to obtain a coating solution, the resulting coating solution is then applied to the conductive undercoat layer C formed on the light-transmitting base material A. Preferable methods for preparing an aqueous wax dispersion include, for example, (1) a method in which melted wax is gradually added to hot water at a temperature near the melting point of the wax while stirring with a homogenizer at 5,000 rpm, and (2) suspension polymerization. When the aqueous wax dispersion is mixed with the aqueous thermoplastic resin, it is preferable that temperature and the solid component concentration be adjusted so that the viscosity of the aqueous thermoplastic resin dispersion is not greater than 200 cps. When the viscosity of the aqueous wax dispersion is higher than 200 cps, fine wax particles aggregate with each other.

Fine wax particles uniformly disperse in a thermoplastic resin of the toner receiving layer formed in such a manner. The fine wax particles are melted when passing through a heat fixing means and migrate to the toner receiving layer surface so as to exhibit the releasing effect.

The light-transmitting recording material for electrophotography in accordance with the present invention must exhibit excellent transparency, have a total light ray transmittance of not less than 80%, preferably not less than 85%, and more preferably, not less than 87%, and have a haze of not more than 10%, preferably not more than 7%, and more preferably not more than 5%. The total light ray transmittance and the haze value in accordance with the present invention is determined based on JIS K-7105. Measurement was performed with a MODEL 100 DP instrument made by Nippon Denshoku Kogyo Co. Ltd.

The heat fixing method in accordance with the present invention is applicable to all electrophotographic processes using toners, such as color copying machines, color printers and color facsimiles. This heat fixing method is preferably applicable to a heat fixing means in which a releasing agent such as oil is not applied to the heat-fixed material, and also applicable to electrophotographic processes using a conventional heat fixing means in which a releasing agent such as oil is applied to the heat-fixed material.

The toner used in the heat fixing method in accordance with the present invention will be illustrated. Since the toner used in the heat fixing method in accordance with the present invention is applied to oil-free fixing processes and fixing processes using small amounts of oil, the toner preferably contains a wax component. Non-limited examples of such wax components include paraffin wax and olefin wax, and modified compounds thereof (for example, oxides and grafted compounds); higher fatty acids and metal salts thereof; and amide wax.

The preferable wax content in the toner ranges from 1 to 50 parts by weight, and more preferably 5 to 45 parts by weight to 100 parts of the binding resin in the toner. When the wax component content is less than 1 part by weight, satisfactory releasability cannot be achieved in fixing processes which use no oil or small amounts of oil, and an offset phenomenon will occur. On the other hand, when the wax content is larger than 50 parts by weight, blocking resistance and shelf life of the toner decrease.

The toner containing the wax component set forth above may be produced by a polymerization toner production process in which monomers are polymerized in the presence of at least a wax component and a colorant, or by a pulverizing toner production process in which a toner mixture comprising a binding resin, a wax and a colorant is melted and mixed, pulverized and classified. A polymerization toner production process and, in particular, an aqueous-suspension-polymerization toner production process is preferably used in the present invention, because a large amount of wax can be present in the toner.

Examples of monomers usable in the polymeric toner include styrene monomers, such as styrene, o-methylstyrene, m-methylstyrene, p-methylstyrene, p-methoxystyrene and p-ethylstyrene; acrylates, such as methyl acrylate, ethyl acrylate, n-butyl acrylate, isobutyl acrylate, n-propyl acrylate, n-octyl acrylate, dodecyl acrylate, 2-ethylhexyl acrylate, stearyl acrylate, 2-chloroethyl acrylate and phenyl acrylate; methacrylates, such as methyl methacrylate, ethyl methacrylate, n-propyl methacrylate, n-butyl methacrylate, isobutyl methacrylate, n-octyl methacrylate, dodecyl methacrylate, 2-ethylhexyl methacrylate, stearyl methacrylate, phenyl methacrylate, dimethylaminoethyl methacrylate and diethylaminoethyl methacrylate; and miscellaneous monomers such as acrylonitrile, methacrylonitrile and acrylamide.

These monomers may be used alone or in a combination of at least two kinds of monomers. Among them, styrene and styrene derivatives are preferably used alone or in combination with another monomer in view of developing characteristics and durability of the toner.

In pulverization toner production processes, examples of binding resins used in the toner include resins obtained by homopolymerization and copolymerization of acids such as acrylic acid, methacrylic acid and maleic acid, and esters thereof; polyesters; polysulfonates; polyethers; and polyurethanes.

Any known colorants can be used as colorants of the toner in accordance with the present invention. Examples of usable colorants include carbon black; iron black; dyes, such as C.I. Direct Red 1, C.I. Direct Red 4, C.I. Acid Red 4, C.I. Basic Red 1, C.I. Mordant Red 30, C.I. Solvent Red 49, C.I. Solvent Red 52, C.I. Direct Blue 1, C.I. Direct Blue 2, C.I. Acid Blue 9, C.I. Acid Blue 15, C.I. Basic Blue 5, C.I. Mordant Blue 7, C.I. Direct Green 6, C.I. Basic Green 4 and C.I. Basic Green 6; yellow pigment, such as chrome yellow, cadmium yellow, mineral first yellow, navel yellow, Naphthol Yellow S, Hanza Yellow G, Permanent Yellow NCG, Tartrazine Lake, molybdenum orange, Permanent Orange GTR, Benzidine Orange G, cadmium red, Permanent Red 4R, Watching Red calcium salt, Brilliant Carmine 3B, Fast Violet B, Methyl Violet Lake, prussian blue, cobalt blue, Alkali Blue Lake, Victoria Blue Lake, quinacridone, disazo type yellow pigments, Phthalocyanine Blue, Fast Sky Blue, Pigment Green B, Malachite Green Lake and Final Yellow Green G. When preparing a toner by a polymerization process in accordance with the present invention, attention must be paid to the polymerization inhibitory action and aqueous phase transfer properties inherent in the colorant. The colorant is preferably subjected to surface modification, for example, hydrophobic treatment using a material free from inhibition of polymerization.

The heat fixing method in accordance with the present invention will be explained.

Figure 2:
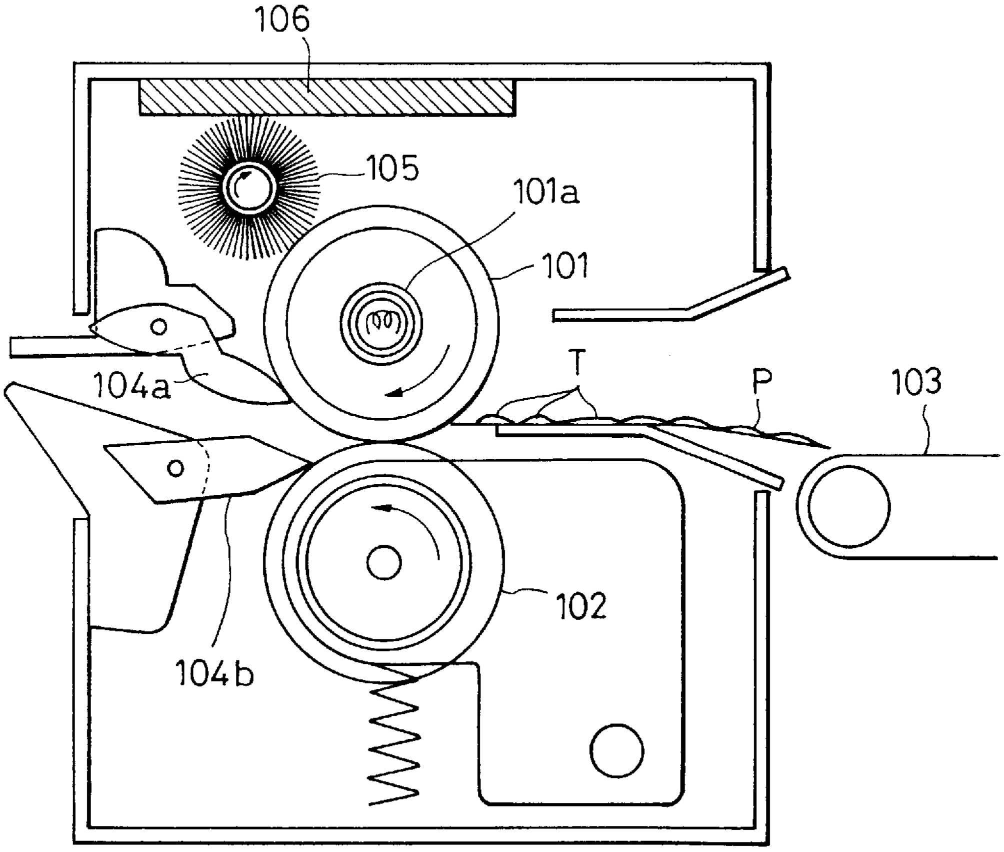
FIG. 2 is a schematic cross-sectional view of a heat fixing means usable for a heat fixing method in accordance with the present invention.

The heat fixing method in accordance with the present invention is characterized in that a toner image is fixed on a light-transmitting recording material for electrophotography set forth above by a heat fixing means. A preferable fixing apparatus applicable to the heat fixing method in accordance with the present invention is illustrated. FIG. 2 is a schematic cross-sectional view of a heating-roller-type heat fixing means, which is provided with a cylindrical heating roller 101 having an internal heater 101*a* therein. The cylindrical heating roller 101 rotates clockwise during fixation. A cylindrical pressure roller 102 comes in contact with the heating roller 101 and rotates counterclockwise during fixation. A recording material A, in which unfixed toner T adheres to the surface as a toner image, is transferred from the right or upstream side of the figure by a transfer belt 103, pressed and heated by the heating roller 101 and the pressure roller 102 to fix the unfixed toner T to the recording material P. The recording material A with a fixed toner image is discharged toward the left or downstream side of the figure.

In FIG. 2, separating claws 104*a* and 104*b* are provided in order to avoid transfer defects due to winding of the recording material P on the heating roller 101 or the pressure roller 102. These separating claws 104*a* and 104*b* peel the wound recording material P from the respective rollers. A felt oil pad 106 is impregnated with a releasing agent having a moderate viscosity such as silicone oil, and a cleaning roller 105 comprises a cylinder and brush-like fibers implanted thereon. The rotating cleaning roller 105 removes the toner residue adhered to the periphery of the heating roller 101 and also moderately feeds the releasing agent on the surface of the heating roller 101. The heat fixing means used in the present invention may be that in which oil is additionally fed as shown in FIG. 2, or may be an oil-free-type heat fixing means in which no oil is fed. In the oil-free-type heat fixing means, the oil pad 106 is, of course, not necessary.

Film-heating-type heating apparatuses have the following advantages in comparison with other types of heating apparatuses, e.g. heat roller type, hot plate type, belt heating type, flash heating type and oven heating type:

(1) In the film-heating-type heating apparatus, a thin film heating member comprising line heater elements of low heat capacity can be used. Thus, electricity can be saved, waiting time can be shortened (the machine can operate quickly), and the temperature rise in the machine can be prevented; and (2) Since the fixing point and the separating point can be independently provided in the film-heating-type apparatus, offset can be effectively prevented, and several defects occurring in other types of apparatuses can be prevented.

Figure 3:
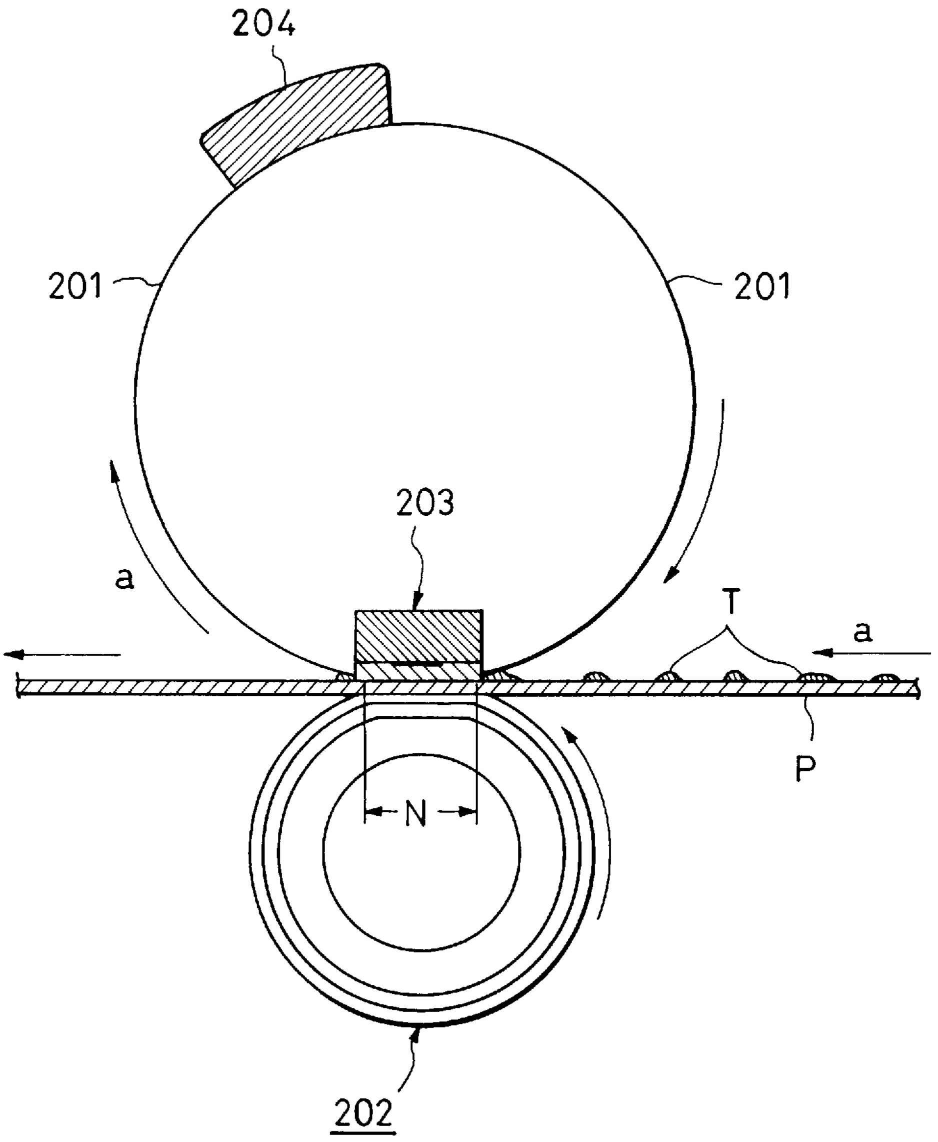
FIG. 3 is a schematic cross-sectional view of another heat fixing means usable for a heat fixing method in accordance with the present invention.

FIG. 3 is a schematic cross-sectional view of a film-heating-type heating apparatus (image heat fixing apparatus) characterized as set forth above. A heater element 203 (a ceramic heater) is held on a support. A heat-resistant film (fixing film) 201 is slidably transferred in close contact with the heater element 203 by aid of a rotating pressure roller 202. A pressure contact nip (a fixing nip) section N is formed by the heater element 203, the pressure roller 202 and the heat-resistant film 201 therebetween. When a recording material P is introduced and transferred between the heat-resistant film 201 and the pressure roller 202 of the pressure contact nip section N, heat from the heater element 203 transfers to the surface of the recording material P through the heat-resistant film 201. The unfixed toner image on the recording material P is fixed by means of the heat. The recording material P passing through the pressure contact nip section N separates from the heat-resistant film 201 and moves to the left side of the figure. An oil pad 204 is provided so as to come in contact with the heat-resistant film 201, in which oil as a releasing agent is impregnated. The oil is fed to the heat-resistant film 201 from the oil pad 204. If this film-type heating apparatus is used as an oil-free fixing means, oil impregnation in the oil pad 204 is not necessary.

In the image fixing apparatus set forth above in accordance with the present invention, it is preferred that large amounts of oil such as silicone oil be not fed to prevent stickiness of the recording material after fixing. However, a small amount of oil not sufficient to cause stickiness of the recording material may be fed to the fixing section between the heat fixing means and the unfixed toner image on the recording material. Oil is fed by impregnating the oil pad 106 in FIG. 2 or the pad 204 in FIG. 3 with oil such as silicone oil. Oil supply to the fixing section is preferably controlled such that the amount of oil applied to the recording material is 0.04 mg/sheet (A4 size) or less, and more preferably 0.02 mg/sheet (A4 size) or less.

In the fixing process of a toner image in accordance with the present invention, both an oil-free heat fixing means and a heat fixing means applying a small amount of oil have the following advantages: The recording material does not adhere to the surface of the heat fixing means during fixation; no irregular electric discharge occurs in low temperature environments (excellent environmental stability) and an image projected from an overhead projector (OHP) after fixing is not grayish even in halftone areas with low image densities, and thus color images or full-color images exhibit excellent color reproducibility.

EXAMPLES

The present invention will now be illustrated in detail based on the following examples.

Example 1

On a light-transmitting base material, i.e., a PET film having a thickness of 100 μm, Coating Solution 1 for an undercoat layer (hereinafter Undercoat Layer Coating Solution) was applied by a bar coating process using a #5 wire bar and dried so that the surface resistivity of the conductive undercoat layer is $1\times10^{8}\Omega$ at 20° C. and 60% relative humidity (RH). The Undercoat Layer Coating solution 1 comprises 60 parts by weight of Sb-doped $SnO_2$ fine particles (average size of secondary particles: 0.2 μm) and 40 parts by weight of an aqueous acrylic resin, and has a 4% solids content. On the surface of the undercoat layer, Coating Solution 1 for a toner receiving layer (hereinafter Toner Receiving Layer Coating Solution) was applied by a bar coating process with a #10 wire bar and dried at 100° C. for 5 minutes so that Recording Material 1 is provided with a toner receiving layer which is 5 μm thick after drying. The Toner Receiving Layer Coating Solution 1 is a mixture comprising 320 parts by weight of Polyester Emulsion A (number average molecular weight: 20,000, Tg: 40° C., solids content: 30%, and softening point: 160° C.) and 9 parts by weight of Carnauba Wax Emulsion 1 (melting point: 86° C. (refer to FIG. 4) and solid component: 45%).

The resulting Recording Material 1 exhibited a surface resistivity of $5\times10^{11}\Omega$ at 20° C. and 60% RH, a surface resistivity of $7\times10^{11}\Omega$ at 20° C. and 15% RH, a transmittance of 90%, and a haze of 0.7%.

(1) The Recording Material 1 exhibited excellent blocking resistance as a result of the following blocking resistance test.

(Blocking Resistance Test)

Two recording materials were overlapped, so that the front face of a recording material comes in contact with the back face of another recording material. The recording materials were pressed under the pressure of 20 kg/cm$^2$ at 25° C. for 25 hours. The resulting blocking was evaluated by the following evaluation standard.

(Evaluation Standard)

A: No blocking

B: Slight blocking

C: Definitive blocking (2) The Recording Material 1 on which an image was formed using Yellow Toner A exhibited excellent releasability as a result of the following releasability test.

(Preparation of Yellow Toner A)

Styrene-butyl acrylate-divinylbenzene copolymer 100 parts

Polyolefin wax (melting point: 100° C.) 5 parts

C.I. Pigment Yellow 17 4.5 parts

Di-tert-butylsalicylic acid metal salt 3 parts

These components were mixed, melt-kneaded with a biaxial extruder, and cooled. The cooled mixture was pulverized with a gas-stream pulverizer. The pulverized product was classified with an air classifier. Yellow toner particles having a weight average particle size of approximately 8.5 μm were obtained. Yellow Toner A was prepared by adding 0.8 parts by weight of negatively-chargeable colloidal silica to 100 parts by weight of the yellow toner particles.

(Releasability Test)

Releasability to Fixing Roller-I

Using the Yellow Toner A, an unfixed yellow toner image was formed on the A4 size Recording Material 1 by the image ratio of 5% by developing and transferring the image with a modified commercially available full-color copying machine (CLC-500 made by Canon Inc.) at 20° C., 60% RH and a developing contrast of 320 V. The unfixed yellow toner image was fixed by passing through an external fixing machine as set forth in FIG. 2 without an oil applying means, of which the surface of the fixing roller is composed of a fluorine resin, at a fixing temperature of 170° C. and a fixing speed of 30 mm/sec. The releasability to the fixing roller-I was evaluated based on the following procedure and evaluation standard. Results are shown in Table 1

(Evaluation Standard)

A (Excellent): The recording material passed through without adhering to the fixing roller.

B (Good): The initial section of the recording material slightly adhered to the fixing roller. However, the recording material passed through without trouble by attaching a separating claw so as to press the fixing roller with a pressure of approximately 10 gf.

C (No good): The recording material still adhered to the fixing roller even using the separating claw so as to press the fixing roller with a pressure of approximately 10 gf.

Releasability to Fixing Roller-2

As in releasability to fixing roller-2, the Recording Material 1 was passed through, without forming a yellow toner image, an external fixing machine not having an oil applying means, of which the surface of the fixing roller is composed of a fluorine resin, at a fixing temperature of 170° C. and a fixing speed of 30 mm/sec or 40 mm/sec. The releasability to the fixing roller-2 was evaluated based on the following evaluation standard. Results are shown in Table 1

(Evaluation Standard)

A (Excellent): The recording material passed through without adhering to the fixing roller.

B (Good): The initial section of the recording material slightly adhered to the fixing roller. However, the recording material passed through without trouble by attaching a separating claw so as to press the fixing roller with a pressure of approximately 10 gf.

C (No good): The recording material still adhered to the fixing roller even using the separating claw so as to press the fixing roller with a pressure of approximately 10 gf.

(3) The Recording Material 1 on which an image was formed using Yellow Toner A exhibited excellent transfer properties without irregular discharge as a result of the following transfer test.

(Transfer Test)

Using Yellow Toner A, a solid image (image area rate: 100%) of unfixed yellow toner particles was formed on Recording Material 1 by developing and transferring with a modified commercially available full-color copying machine (CLC-500 made by Canon Inc.), under a developing environment of 20° C. and 15% RH. The transferring properties of the solid image on Recording Material 1 were visually evaluated based on the following evaluation standard. The results are shown in Table 1.

(Evaluation Standard)

A (Excellent): Toners are uniformly transferred without irregular densities.

B (Good): No untransferred section is present although slight irregular densities are observed.

C (No good): Untransferred sections of approximately 1 cm diameter are found over the recording material.

(4) The Recording Material 1 on which an image was formed using Yellow Toner A exhibited an excellent image projection characteristics as a result of the following image projection test. The results are shown in Table 1.

(Image Projection Test)

A yellow toner image having solid sections and highlight sections was formed by developing and transferring with a modified commercially available full-color copying machine (CLC-500 made by Canon Inc.), at a developing contrast of 320 V under a developing environment of 20° C. and 60% RH, and fixing the formed image with an external fixing machine not having an oil applying means, of which the surface of the fixing roller is composed of a fluorine resin, at a fixing temperature of 170° C. and a fixing speed of 30 mm/sec. The image on the Recording Material 1 was projected on a screen with an OHP and visually evaluated based on the following evaluation standard.

(Evaluation Standard)

Solid Image Section (High Image Density Section)

A: Excellent color reproducibility

B: Slightly reddish tone

C: Orange tone

Highlight Section (Halftone Section)

A: Excellent color reproducibility without a grayish tone

B: Slightly grayish and orange color tones

C: Definitive grayish tone

The highlight section indicates that the resulting yellow toner image has a yellow density of 0.2 to 1.5 which was determined using a Macbeth densitometer RD-1255.

Examples 3–5 and Comparative Examples 8–10

Each of Recording Materials 2–7 was prepared and evaluated as in Example 1 except that a wire bar shown in Table 1 was used for applying the Toner Receiving Layer Coating Solution 1 and the thickness after drying of the formed toner receiving layer was changed as shown in Table 1. The results are shown in Table 1.

Examples 8–12 and Comparative Examples 8–13

Each of Recording Materials 8–12 was prepared and evaluated as in Example 1 except that Toner Receiving Layer Coating Solution 2 containing Styrene-2-ethylhexyl acrylate Emulsion B (number average molecular weight: 50,000, Tg: 40° C., and solids content: 25%) instead of Polyester Resin Emulsion A was used for forming the toner receiving layer, a wire bar shown in Table 1 was used for applying the Toner Receiving Layer Coating Solution 2 and the thickness after drying of the formed toner receiving layer was changed as shown in Table 1. The results are shown in Table 1.

Comparative Example 1

The Toner Receiving Layer Coating Solution 1 was directly applied to a light-transmitting base material of PET having a thickness of 100 $\mu$m with a #10 wire bar, without forming a conductive undercoat layer, and dried to obtain a toner receiving layer. Next, a conductive topcoat layer was formed by applying a coating solution for a topcoat layer which was obtained by diluting the Undercoat Layer Coating Solution 1 and had a solids content of 1%. Recording Material 13 prepared in such a manner was evaluated as in Example 1. Although the resulting image has almost the same toner quantity as Example 1, the image projection property deteriorates due to the increased haze as shown in Table 1 compared to Example 1. Also, the releasability to the fixing roller-2 is slightly decreased at a higher fixing speed (40 mm/sec). The results are summarized in Table 1.

Comparative Example 2

Recording Material 14 was prepared as in Example 1, except that Undercoat Layer Coating Solution 2 comprising a 4 wt % PQ-50B in isopropyl alcohol solution was used instead of the Undercoat Layer Coating Solution 1, wherein PQ-50B was an organo-polymeric antistatic agent made by Soken Chemical & Engineering Co., Ltd. The surface resistivity of the resulting conductive undercoat layer was $1\times10^{8}\Omega$ at 25° C. and 60% RH. The Recording Material 14 was evaluated as in Example 1. The image quality as an OHP sheet is unsatisfactory due to unstable transfer characteristics, e.g. blanking and toner spattering. The results are summarized in Table 1.

Comparative Example 3

Recording Material 15 was prepared as in Example 1 except that Undercoat Layer Coating Solution 3 having a solid content of 1% as in Comparative Example 2 was used instead of Undercoat Layer Coating Solution 1. The surface resistivity of the resulting Recording Material 15 was $5\times10^{11}\Omega$. The Recording Material 15 was evaluated as in Example 1. The image quality as an OHP sheet is unsatisfactory due to unstable transfer characteristics, e.g. blanking and toner spattering. The results are summarized in Table 1.

Comparative Example 4

Recording Material 16 was prepared as in Example 1 except that the solid content of the Undercoat Layer Coating Solution 1 is increased to 20% from 2% in Example 1. The surface resistivity of the resulting Recording Material 16 was $5\times10^{6}\Omega$. The Recording Material 16 was evaluated as in Example 1. The haze of the recording material itself increases as shown in Table 1 and the resulting image has a low density. The results are summarized in Table 1.

Comparative Example 5

Recording Material 17 was prepared as in Comparative Example 4 except that a wire bar shown in Table 1 was used and the thickness of the toner receiving layer was changed as shown in Table 1. The Recording Material 17 was evaluated as in Example 1. The haze of the recording material itself increases as shown in Table 1 and the image projection property decreases compared to Example 1.

Comparative Example 6

Recording Material 18 was prepared as in Example 1 except that Toner Receiving Layer Coating Solution 3 containing only Polyester Emulsion A and thus not containing the Carnauba Wax Emulsion 1 was used instead of the Toner Receiving Layer Coating Solution 1 . The Recording Material 18 was evaluated as in Example 1. As shown in Table 1, the Recording Material 18, in which hydrophobic wax is not present in the toner receiving layer, has a low surface resistivity by one figure, but does not exhibit satisfactory releasability of the OHP sheet.

TABLE 1

| | Recording material | Undercoat layer coating solution | Surface resistivity of undercoat layer (Ω) 20° C. 60% RH | Toner receiving layer coating solution | Wire bar | Thickness of toner receiving layer (μm)*1 | Surface resistivity of recording material (Ω) at 20° C. 60% RH | Surface resistivity of recording material (Ω) at 20° C. 15% RH | Releasability −1 | Releasability −2 30 mm/sec | Releasability −2 40 mm/sec | Light transmittance(%) | Haze (%) *2 | Blocking resistance | Image projection characteristics Solid portion | Image projection characteristics Highlight |
|---|---|---|---|---|---|---|---|---|---|---|---|---|---|---|---|---|
| Ex. 1 | 1 | 1 | $1 \times 10^8$ | 1 | #10 | 5 | $5 \times 10^{11}$ | $7 \times 10^{11}$ | A | A | A | 90 | 0.7 | A | A | A |
| Ex. 2 | 2 | 1 | $1 \times 10^8$ | 1 | #4 | 1 | $8 \times 10^{10}$ | $2 \times 10^{11}$ | A | A | A | 89 | 0.9 | A | B | B |
| Ex. 3 | 3 | 1 | $1 \times 10^8$ | 1 | #6 | 2–3 | $3 \times 10^{11}$ | $5 \times 10^{11}$ | A | A | A | 89 | 0.9 | A | A | A |
| Ex. 4 | 4 | 1 | $1 \times 10^8$ | 1 | #22 | 10 | $5 \times 10^{11}$ | $8 \times 10^{11}$ | A | A | A | 90 | 0.9 | A | A | A |
| Ex. 5 | 5 | 1 | $1 \times 10^8$ | 1 | #30 | 15 | $8 \times 10^{11}$ | $1 \times 10^{12}$ | A | A | A | 90 | 0.8 | A | A | A |
| Ex. 6 | 6 | 1 | $1 \times 10^8$ | 1 | #40 | 23 | $2 \times 10^{12}$ | $5 \times 10^{12}$ | A | A | A | 89 | 0.8 | B | A | B |
| Ex. 7 | 7 | 1 | $1 \times 10^8$ | 1 | #60 | 35 | $1 \times 10^{14}$ | $3 \times 10^{14}$ | B | A | A | 87 | 1.0 | B | B | B |
| Ex. 8 | 8 | 1 | $1 \times 10^8$ | 2 | #6 | 2–3 | $2 \times 10^{11}$ | $5 \times 10^{11}$ | A | A | A | 90 | 0.8 | A | A | A |
| Ex. 9 | 9 | 1 | $1 \times 10^8$ | 2 | #0 | 5 | $4 \times 10^{11}$ | $6 \times 10^{11}$ | A | A | A | 91 | 0.7 | A | A | A |
| Ex. 10 | 10 | 1 | $1 \times 10^8$ | 2 | #22 | 10 | $6 \times 10^{11}$ | $1 \times 10^{12}$ | A | A | A | 91 | 0.8 | A | A | A |
| Ex. 11 | 11 | 1 | $1 \times 10^8$ | 2 | #30 | 15 | $1 \times 10^{12}$ | $2 \times 10^{12}$ | A | A | A | 90 | 0.9 | A | A | A |
| Ex. 12 | 12 | 1 | $1 \times 10^8$ | 2 | #40 | 23 | $4 \times 10^{12}$ | $7 \times 10^{12}$ | A | A | A | 90 | 0.9 | A | A | B |
| Comp. Ex. 1 | 13 | None*3 | | 1 | #10 | 5 | $7 \times 10^{11}$ | $1 \times 10^{12}$ | B | A | B | 86 | 2.0 | A | B | B |
| Comp. Ex. 2 | 14 | 2 | $1 \times 10^8$ | 1 | #19 | 5 | $2 \times 10^{15}$ | $9 \times 10^{15}$ | A | A | A | 89 | 0.8 | A | —[1] | —[1] |
| Comp. Ex. 3 | 15 | 3 | $5 \times 10^{11}$ | 1 | #10 | 5 | $6 \times 10^{14}$ | $1 \times 10^{23}$ | A | A | A | 91 | 0.6 | A | —[1] | —[1] |
| Comp. Ex. 4 | 16 | 4 | $5 \times 10^6$ | 1 | #10 | 5 | $8 \times 10^8$ | $2 \times 10^9$ | A | A | A | 83 | 3.9 | A | —[2] | —[2] |
| Comp. Ex. 5 | 17 | 4 | $5 \times 10^6$ | 1 | #30 | 15 | $5 \times 10^{10}$ | $6 \times 10^{10}$ | A | A | A | 82 | 4.2 | A | B | B |
| Comp. Ex. 6 | 18 | 1 | $1 \times 10^8$ | 3 | #10 | 5 | $5 \times 10^{10}$ | $5 \times 10^{10}$ | C | C | C | 91 | 0.8 | B | —[3] | —[3] |

*1 The thickness of the toner receiving layer indicates an average of 10 points.
*2 The haze is preferably 2 or less, and more preferably 1.5 or less. The haze was determined with MODEL 1001DP made by Nippon Denshoku Kogyo Co., Ltd.
*3 A conductive top layer was formed by applying a coating solution to the toner receiving layer.
[1] Disordered image formation due to irregular density and toner spatter (irregular discharge).
[2] Only light toner image is obtainable.
[3] Not capable of heat fixing.

Example 13

On a PET film having a thickness of 100 μm as a light-transmitting base material, Undercoat Layer Coating Solution 5 was applied by a bar coating process using a #5 wire bar and dried so that the surface resistivity of the conductive undercoat layer is 1×10$^8$Ω at 20° C. and 60% RH. The Undercoat Layer Coating Solution 5 comprises 60 parts by weight of Sb-doped $SnO_2$ fine particles (average size of secondary particles: 0.2 μm) and 40 parts by weight of an aqueous polyester resin and contains 4% of solid components. On the surface of the undercoat layer, Toner Receiving Layer Coating Solution 4 was applied by a bar coating process with a #16 wire bar and dried at 100° C. for 10 minutes so that Recording Material 19 was provided with a toner receiving layer of 8 μm thick after drying. Toner Receiving Layer Coating Solution 4 was prepared by mixing 96 parts by weight of Aqueous Polyester Emulsion C (number average molecular weight: 20,000, Tg: 23° C.) and 4 parts by weight of the aqueous Carnauba Wax Emulsion 1 (melting point: 86° C. and solid component: 45%) set forth in Example 1, while maintaining the emulsion viscosity to 100 cps.

The resulting Recording Material 19 has a surface resistivity of 6×10$^{11}$Ω at 20° C. and 60% RH, a surface resistivity of 8×10$^{11}$Ω at 20° C. and 15% RH, a transmittance of 89%, a haze of 0.8% and an average dispersion diameter of the wax present in the toner receiving layer of 0.10 μm.

(Preparation of Yellow Toner B)

A dispersion medium containing $Ca_3(PO_4)_2$ was prepared as follows: Into 709 parts by weight of deionized water, 451 parts by weight of an aqueous 0.1M-$Na_3PO_4$ solution was added, heated to 60° C., and stirred with a TK homomixer (made by Tokushukika Kogyo Co., Ltd.) at 2,000 rpm. Then, 67.7 parts by weight of an aqueous 1.0M-$CaCl_2$ solution was gradually added to the solution.

Styrene 100 parts

2-Ethylhexyl acrylate 30 parts

Paraffin wax (melting point: 75° C.) 50 parts

C.I. Pigment Yellow 17 8 parts

Styrene-methacrylic acid-methyl methacrylate copolymer 5 parts

Di-tert-butylsalicylic acid metal salt 3 parts

Among these components, C.I. Pigment Yellow 17, di-tert-butylsalicylic acid metal salt and styrene were preliminary mixed with an Ebara Milder™ (made by Ebara Corporation) as line type mixer. All the components were heated to 60° C., mixed to prepare a monomer dispersion. While holding the dispersion at 60° C., 10 parts by weight of dimethyl-2,2'-azobisisobutylate was dissolved into the dispersion as an initiator to prepare a monomer composition. Into the dispersion medium which was prepared in a 2 liter flask of the homomixer as set forth above, the monomer composition was placed. The monomer composition was stirred with a TK homomixer at 60° C. and 10,000 rpm for 20 minutes in a nitrogen atmosphere to granulate the monomer composition. The composition was further stirred with a paddle agitator at 60° C. for 3 hours and polymerized at 80° C. for 10 hours. After polymerization, the product was cooled and hydrochloric acid was added to dissolve $Ca_3(PO_4)_2$. The dispersion was filtered and the polymer was washed with water and dried to obtain yellow toner particles.

The resulting yellow toner particles had a weight average particle size of 8.1 μm and a sharp particle size distribution which was determined with Coulter Counter. Yellow Toner B was obtained by adding 0.7 parts by weight of a hydrophobic silica having a specific surface area of 200 m$^2$/g by a BET method to 100 parts by weight of the yellow toner particles.

Using Yellow Toner B instead of Yellow Toner A, the Recording Material 19 was evaluated as in Example 1. The results are shown in Table 2.

Yellow Toner A was prepared by adding 0.8 parts by weight of negatively-chargeable colloidal silica to 100 parts by weight of the yellow toner particles.

Example 14

Recording Material 20 was prepared as in Example 13, except that Toner Receiving Layer Coating Solution 5 containing Polyester Emulsion D (number average molecular weight: 10.000, Tg: 62° C., solids content: 25%, softening point: 130° C.) was used instead of the Toner Receiving Layer Coating Solution 4 containing Polyester Emulsion C.

The Recording Material 20 was evaluated as in Example 13. The results are summarized in Table 2.

Example 15

Recording Material 21 was prepared as in Example 13, except that Toner Receiving Layer Coating Solution 6 containing Polyester Emulsion E (number average molecular weight: 20.000, Tg: −10° C., solids content: 25% , softening point: 140° C.) was used instead of the Toner Receiving Layer Coating Solution 4 containing Polyester Emulsion C.

The Recording Material 21 was evaluated as in Example 13. The results are summarized in Table 2.

Example 16

Recording Material 22 was prepared as in Example 13, except that Toner Receiving Layer Coating Solution 7 containing Polyester Emulsion E (number average molecular weight: 20.000, Tg: −20° C., solids content: 25%, softening point: 135° C.) was used instead of the Toner Receiving Layer Coating Solution 4 containing Polyester Emulsion C.

The Recording Material 22 was evaluated as in Example 13. The results are summarized in Table 2.

Example 17

Recording Material 23 was prepared as in Example 13, except that Toner Receiving Layer Coating Solution 8 containing Polyethylene Wax Emulsion 2 (melting point: 116° C., solid content: 30%) was used instead of the Toner Receiving Layer Coating Solution 4 containing Carnauba Wax Emulsion 1.

The Recording Material 23 was evaluated as in Example 13. The results are summarized in Table 2.

Example 18

Recording Material 24 was prepared as in Example 13, except that Toner Receiving Layer Coating Solution 9 containing Stearic Acid Amide Emulsion 3 (melting point: 100° C., solids content: 40%) was used instead of the Toner Receiving Layer Coating Solution 4 containing Carnauba Wax Emulsion 1.

The Recording Material 24 was evaluated as in Example 13. The results are summarized in Table 2.

Example 19

Recording Material 25 was prepared as in Example 13, except that the composition of the toner receiving layer coating solution was changed, that is, Toner Receiving Layer Coating Solution 10 containing 85 parts by weight of Polyester Emulsion F (number average molecular weight: 50.000, Tg: 33° C., solids content: 25%, softening point: 145° C.) and 15 parts by weight of Carnauba Wax Emulsion 1 was used instead of the Toner Receiving Layer Coating Solution 4 containing Polyester Emulsion C.

The Recording Material 25 was evaluated as in Example 13. The results are summarized in Table 2.

Example 20

Recording Material 26 was prepared as in Example 13, except that Toner Receiving Layer Coating Solution 11 containing 20 parts by weight of Polyester Resin G (number average molecular weight: 15.500, Tg: 47° C.), 1 part by weight of lanolin wax (melting point: 64° C.), 64 parts by weight of toluene and 15 parts by weight of methyl ethyl ketone (MEK) was used instead of the Toner Receiving Layer Coating Solution 4 containing Polyester Emulsion C, and the solution was applied by a bar coating process with a #20 wire bar and dried at 100° C. for 10 minutes. The resulting Recording Material 26 had a dry thickness of 10 μm.

The Recording Material 26 was evaluated as in Example 13. The results are summarized in Table 2.

Example 21

Recording Material 27 was prepared as in Example 20, except that Toner Receiving Layer Coating Solution 12 containing Polyester Resin H (number average molecular weight: 22.500, Tg: 72° C.) was used instead of the Toner Receiving Layer Coating Solution 11 containing Polyester Resin G.

The Recording Material 27 was evaluated as in Example 13. The results are summarized in Table 2.

Example 22

Recording Material 28 was prepared as in Example 20, except that Toner Receiving Layer Coating Solution 13 containing Polyester Resin I (number average molecular weight: 15,000, Tg: 67° C.) was used instead of the Toner Receiving Layer Coating Solution 11 containing Polyester Resin G.

The Recording Material 28 was evaluated as in Example 13. The results are summarized in Table 2.

Example 23

Recording Material 29 was prepared as in Example 19 but using Toner Receiving Layer Coating Solution 14 instead of the Toner Receiving Layer Coating Solution 10, in which the Toner Receiving Layer Coating Solution 14 was prepared while adjusting the viscosity of the styrene-2-ethylhexyl acrylate emulsion to 300 cps during mixing.

The Recording Material 29 was evaluated as in Example 13. The results are summarized in Table 2.

Comparative Example 7

Recording Material 30 was prepared as in Example 13, except that Toner Receiving Layer Coating Solution 15 not containing the Carnauba Wax Emulsion 1 was used instead of the Toner Receiving Layer Coating Solution 4.

The Recording Material 30 was evaluated as in Example 13. The results are summarized in Table 2.

Example 24

The Recording Material 19 which was obtained in Example 13 was evaluated with an external fixing machine as in Example 1, while applying oil using an oil coating machine in an amount of 0.04 mg/sheet (A4 size). The results are summarized in Table 2.

TABLE 2

| | Recording material | Undercoat layer coating solution | Surface resistivity of undercoat layer (Ω) 20° C. 60% RH | Toner receiving layer coating solution | Wire bar | Thickness of toner receiving layer (μm)*1 | Average dispersion diameter of wax in toner receiving layer 60% RH | Surface resistivity of recording material (Ω) at 20° C. 15% RH | Surface resistivity of recording material (Ω) at 20° C. −1 | Releasability sec | Releasability −2 30 mm/sec | Releasability −2 40 mm/(%) | Light transmittance *2 | Haze (%) tance | Blocking resis-portion | Image projection characteristics Solid light | Image projection characteristics High- |
|---|---|---|---|---|---|---|---|---|---|---|---|---|---|---|---|---|---|
| Ex. 13 | 19 | 5 | $1 \times 10^8$ | 4 | #16 | 8 | 0.10 | $6 \times 10^{11}$ | $8 \times 10^{11}$ | A | A | A | 89 | 0.8 | A | A | A |
| Ex. 14 | 20 | 5 | $1 \times 10^8$ | 5 | #16 | 8 | 0.30 | $5 \times 10^{11}$ | $6 \times 10^{11}$ | A | A | A | 87 | 1.2 | A | B | B |
| Ex. 15 | 21 | 5 | $1 \times 10^8$ | 6 | #16 | 8 | 0.08 | $8 \times 10^{11}$ | $1 \times 10^{12}$ | A | A | A | 90 | 0.7 | A | A | A |
| Ex. 16 | 22 | 5 | $1 \times 10^8$ | 7 | #16 | 8 | 0.12 | $5 \times 10^{11}$ | $7 \times 10^{11}$ | A | A | B | 89 | 0.9 | A | A | A |
| Ex. 17 | 23 | 5 | $1 \times 10^8$ | 8 | #16 | 8 | 0.50 | $2 \times 10^{11}$ | $5 \times 10^{11}$ | A | A | B | 85 | 1.5 | A | B | B |
| Ex. 18 | 24 | 5 | $1 \times 10^8$ | 9 | #16 | 8 | 0.23 | $2 \times 10^{11}$ | $6 \times 10^{11}$ | A | A | A | 88 | 1.2 | A | A | A |
| Ex. 19 | 25 | 5 | $1 \times 10^8$ | 10 | #16 | 8 | 0.48 | $5 \times 10^{11}$ | $8 \times 10^{11}$ | A | A | B | 85 | 1.4 | A | B | B |
| Ex. 20 | 26 | 5 | $1 \times 10^8$ | 11 | #20 | 8 | 0.22 | $4 \times 10^{11}$ | $6 \times 10^{11}$ | A | A | A | 88 | 0.9 | A | A | A |
| Ex. 21 | 27 | 5 | $1 \times 10^8$ | 12 | #20 | 8 | 0.70 | $7 \times 10^{11}$ | $1 \times 10^{11}$ | A | A | A | 84 | 1.6 | A | B | B |
| Ex. 22 | 28 | 5 | $1 \times 10^8$ | 13 | #20 | 8 | 1.20 | $4 \times 10^{11}$ | $8 \times 10^{11}$ | A | A | A | 82 | 1.8 | A | B | B |
| Ex. 23 | 29 | 5 | $1 \times 10^8$ | 14 | #16 | 8 | 1.80 | $5 \times 10^{11}$ | $8 \times 10^{11}$ | A | A | B | 80 | 2.0 | A | B | B |
| Ex. 24 | 19 | 5 | $1 \times 10^8$ | 4 | #16 | 8 | 0.10 | $6 \times 10^{11}$ | $8 \times 10^{11}$ | A | A | A | 89 | 0.8 | A | A | A |
| Comp. Ex. 7 | 30 | 5 | $1 \times 10^8$ | 15 | #16 | 8 | —[4] | $7 \times 10^{10}$ | $7 \times 10^{10}$ | C | C | C | 90 | 0.6 | B | —[5] | —[5] |

[4]Wax is not used.
[5]Not capable of heat fixing. (Table 2)

Example 25

(Preparation of Magenta Toner C)

Magenta Toner C was prepared as in preparation of Yellow Toner B, except that 9 parts by weight of C.I. Pigment Red 122 was used instead of C.I. Pigment Yellow 17.

(Preparation of Cyan Toner D)

Cyan Toner D was prepared as in preparation of Yellow Toner B, except that 10 parts by weight of C.I. Pigment Blue 15 was used instead of C.I. Pigment Yellow 17.

(Preparation of Black Toner E)

Black Toner E was prepared as in preparation of Yellow Toner B, except that 12 parts by weight of commercially available carbon black was used instead of C.I. Pigment Yellow 17.

Using the Yellow Toner B, Magenta Toner C, Cyan Toner D, and Black Toner E, an unfixed full-color toner image was formed on the A4 size Recording Material 19 in Example 13 by with an image ratio of 5% by developing and transferring the image with a modified commercially available full-color copying machine (CLC-500 made by Canon Inc.) at 20° C., 15% RH and a developing contrast of 320 V. No irregular electric discharge was observed. The unfixed full-color toner image was fixed by passing through an external fixing machine as set forth in FIG. 2 without an oil applying means, of which the surface of the fixing roller is composed of a fluorine resin, at a fixing temperature of 170° C. and a fixing speed of 30 mm/sec.

The fixation had been satisfactorily achieved without adhering the Recording Material 19 to the fixing roller. A fresh and clear full-color image without grayish highlight sections was observed from OHP projection of the resulting Recording Material 19.

Example 26

An unfixed full-color toner image on the Recording Material 19 was fixed as in Example 25, except for using a film-heating-type fixing apparatus shown in FIG. 3 (not having an oil coating means) at a fixing temperature of 170° C. and a fixing speed of 30 mm/sec instead of the external fixing machine. The fixation had also been satisfactorily achieved without adhering the Recording Material 19 to the fixing roller. A fresh and clear full-color image without grayish highlight sections was observed with high transparency from OHP projection of the resulting Recording Material 19.

The invention may be embodied in other specific forms without departing from the spirit or essential characteristics thereof. The present embodiments and examples are therefore to be considered in all respects as illustrative and not restrictive, the scope of the invention being indicated by the appended claims rather than by the foregoing description and all changes which some within the meaning and range of equivalency of the claims are thereof intended to be embraced therein.

What is claimed is:

1. A light-transmitting recording material for electrophotography comprising:

a base material, a conductive undercoat layer formed on said base material, and a toner acceptable layer formed on said conductive undercoat layer; wherein surface resistivity of said conductive undercoat layer ranges from $1\times10^7\Omega$ to $1\times10^{10}\Omega$ at 20° C. and 60% relative humidity, and said conductive undercoat layer contains a metallic conductive or semiconductive material;

said toner acceptable layer comprises a wax as a releasing agent and a thermoplastic resin; said toner acceptable layer has a thickness of 2 to 15 $\mu$m; and said light-transmitting recording material has a surface resistivity of $1\times10^8\Omega$ to $1\times10^{13}\Omega$ at 20° C. and 60% relative humidity, and a total light ray transmittance of 80% or more and a haze value of 10 or less.

2. A light-transmitting recording material according to claim 1, wherein said metallic conductive or semiconductive material is at least a metal or an oxide of said metal, wherein said metal is selected from the group consisting of Sn, Sb, In, Ag, Zn and Ti.

3. A light-transmitting recording material according to claim 2, wherein said oxide of said metal is Sn-doped $In_2O_3$ or Sb-doped $SnO_2$.

4. A light-transmitting recording material according to claim 1, wherein said surface resistivity of said conductive undercoat layer ranges from $1\times10^7\Omega$ to $5\times10^9\Omega$ at 20° C. and 60% relative humidity.

5. A light-transmitting recording material according to claim 1, wherein said metallic conductive or semiconductive material has an average particle size of 0.3 $\mu$m or less.

6. A light-transmitting recording material according to claim 1, wherein said thermoplastic resin has a number average molecular weight of 3,000 to 500,000.

7. A light-transmitting recording material according to claim 1, wherein said thermoplastic resin has a glass transition temperature of −10° C. to 80° C.

8. A light-transmitting recording material according to claim 1, wherein said wax is at least one wax selected from the group consisting of vegetable waxes, vegetable wax derivatives, mineral waxes, mineral wax derivatives, animal waxes, animal wax derivatives, petroleum waxes, petroleum wax derivatives, synthetic waxes, synthetic wax derivatives, higher fatty acids, higher alcohols, esters and amides.

9. A light-transmitting recording material according to claim 1, wherein said wax is contained in said toner acceptable layer in an amount of 0.01 to 30 percent by weight based on said toner acceptable layer.

10. A light-transmitting recording material according to claim 1, wherein said wax is present in said toner acceptable layer in an amount of 0.1 to 30 percent by weight based on said toner acceptable layer.

11. A light-transmitting recording material according to claim 1, wherein said wax has a melting point of 40° C. to 120 ° C.

12. A light-transmitting recording material according to claim 1, wherein said wax has a melting point of 50° C. to 120° C.

13. A light-transmitting recording material according to claim 1, wherein said wax is dispersed into said toner acceptable layer with an average dispersion diameter of less than 1 $\mu$m.

14. A light-transmitting recording material according to claim 1, wherein said wax is dispersed into said toner acceptable layer with an average dispersion diameter from 0.01 $\mu$m to less than 1 $\mu$m.

15. A light-transmitting recording material according to claim 1, wherein said light-transmitting recording material has a total light ray transmittance of 85% or more and a haze value of 7 or less.

16. A heat fixing method comprising:

forming a toner image from a toner on a light-transmitting recording material; and heat fixing the toner image of the light-transmitting recording material by a heat fixing means; wherein said light-transmitting recording material comprises a base material, a conductive undercoat layer formed on said base material, and a toner acceptable layer formed on said conductive undercoat layer;

surface resistivity of said conductive undercoat layer ranges from $1\times10^7\Omega$ to $1\times10^{10}\Omega$ at 20° C. and 60% relative humidity, said conductive undercoat layer contains a metallic conductive or semiconductive material;

said toner acceptable layer comprises a wax as a releasing agent and a thermoplastic resin; said toner acceptable layer has a thickness of 2 to 15 $\mu$m; and said light-transmitting recording material has a surface resistivity of $1\times10^8\Omega$ to $1\times10^{13}\Omega$ at 20° C. and 60% relative humidity and a total light ray transmittance of 80% or more and a haze value of 10 or less.

17. A heat fixing method according to claim 16, wherein said metallic conductive material is at least a metal or an oxide of said metal, said metal selected from the group consisting of Sn, Sb, In, Ag, Zn and Ti and the metal.

18. A heat fixing method according to claim 17, wherein said oxide of said metal is Sn-doped $In_2O_3$ or Sb-doped $SnO_2$.

19. A heat fixing method according to claim 16, wherein said the surface resistivity of said conductive undercoat layer formed ranges from $1\times10^7\Omega$ to $5\times10^9\Omega$ at 20° C. and 60% relative humidity.

20. A heat fixing method according to claim 16, wherein said metallic conductive or semiconductive material has an average particle size of 0.3 $\mu$m or less.

21. A heat fixing method according to claim 16, wherein said thermoplastic resin has a number average molecular weight of 3,000 to 500,000.

22. A heat fixing method according to claim 16, wherein said thermoplastic resin has a glass transition temperature of −10° C. to 80° C.

23. A heat fixing method according to claim 16, wherein said wax is at least one wax selected from the group consisting of vegetable waxes, vegetable wax derivatives, mineral waxes, mineral wax derivatives, animal waxes, animal wax derivatives, petroleum waxes, petroleum wax derivatives, synthetic waxes, synthetic wax derivatives, higher fatty acids, higher alcohols, esters and amides.

24. A heat fixing method according to claim 16, wherein said wax is contained in said toner acceptable layer in an amount of 0.01 to 30 percent by weight based on said toner acceptable layer.

25. A heat fixing method according to claim 16, wherein said wax is present in said toner acceptable layer in an amount of 0.1 to 30 percent by weight based on said toner acceptable layer.

26. A heat fixing method according to claim 16, wherein said wax has a melting point of 40° C. to 120° C.

27. A heat fixing method according to claim 16, wherein said wax has a melting point of 50° C. to 120° C.

28. A heat fixing method according to claim 16, wherein said wax is dispersed into said toner acceptable layer with an average dispersion diameter of less than 1 $\mu$m.

29. A heat fixing method according to claim 16, wherein said wax is dispersed into said toner acceptable layer with an average dispersion diameter from 0.01 $\mu$m to less than 1.00 $\mu$m.

30. A heat fixing method according to claim 16, wherein said light-transmitting recording material has a total light ray transmittance of 85% or more and a haze value of 7 or less.

31. A heat fixing method according to claim 16, wherein said toner comprises a binding resin, a wax component and a colorant, said wax component being present in said toner in an amount of 1 to 50 parts by weight to 100 parts by weight of said binding resin.

32. A heat fixing method according to claim 16, wherein said toner comprises at least a binding resin, a wax component and a colorant, said wax component present in said toner in an amount of 5 to 45 parts by weight based on 100 parts by weight of said binding resin.

33. A heat fixing method according to claim 16, wherein heat fixing of said toner image to said light-transmitting recording material is performed without feeding oil to a fixing surface of said heat fixing means in contact with said toner image.

34. A heat fixing method according to claim 16, wherein heat fixing of said toner image to said light-transmitting recording material is performed while feeding oil to a fixing surface of said heat fixing means in contact with said toner image such that 0.04 mg per A4 sheet of oil is coated on said light-transmitting recording material.

* * * * *

CERTIFICATE OF CORRECTION

PATENT NO. : 5,853,875

DATED : December 29, 1998

INVENTOR(S) : YOMISHI TOSHIDA ET AL.

It is certified that error appears in the above-identified patent and that said Letters Patent is hereby corrected as shown below:

COLUMN 1

Line 57, "is" should be deleted.

COLUMN 2

Line 50, "decreases" should read --decrease--.

COLUMN 6

Line 30, "thickness" should read --thickness of--.
Line 54, "size" should read --size of--.
Line 62, "(length+breadth)" should read --(length+breadth)/2--.
Line 63, "/2" should be deleted.

COLUMN 16

Line 34, "Examples 8-12" should read --Examples 8-11--; and "Examples 8-13" should read --Examples 11--.

UNITED STATES PATENT AND TRADEMARK OFFICE

CERTIFICATE OF CORRECTION

PATENT NO. : 5,853,875

DATED : December 29, 1998

INVENTOR(S) : YOMISHI TOSHIDA ET AL.

It is certified that error appears in the above-identified patent and that said Letters Patent is hereby corrected as shown below:

COLUMNS 19-20

Table 1, in Col. 1, "Ex. 2" should read --Comparative Example 8--; "Ex. 6" should read --Comp. Ex. 9--; "Ex. 7" should read --Comp. Ex. 10--; and "Ex. 12" should read --Comp. Ex. 11--.

In Col. 6, "#0" should read --#10--; and "#19" should read --#10--.

In Col.8, "$1x10^{15}$" should read --$11x10^{15}$--.

COLUMN 21

Line 47, "liminary" should read --liminarily-.

COLUMN 22

Line 15, "10.000," should read --10,000,--.
Line 25, "20.000," should read --20,000,--; and "25% ," should read --25%,--.
Line 37, "20.000," should read --20,000,--.

UNITED STATES PATENT AND TRADEMARK OFFICE
CERTIFICATE OF CORRECTION

PATENT NO. : 5,853,875

DATED : December 29, 1998

INVENTOR(S) : YOMISHI TOSHIDA ET AL.

It is certified that error appears in the above-identified patent and that said Letters Patent is hereby corrected as shown below:

COLUMN 23

Line 4, "50.000," should read --50,000,--.
Line 15, "15.500," should read --15,500,--.
Line 32, "22.500," should read --22,500,--.

COLUMNS 25-26

Table 2, In Col. 8, "60%RH" should read --(μm)--.
In Col. 9, "15%RH" should read --60%RH--; and "-1" should read --15%RH--; and "8x10" should read --6x$10^{11}$--.
In Col. 10, "sec." should read -01-.
In Col. 11, "(%)" should read --sec--.
In Col. 12, "*2" should read --(%)--.
In Col. 13, "tance" should read --*2--.
In Col. 14, "portion" should read --tance--.
In Col. 15, "light" should read --portion--; and "High-" should read --High-light--.

UNITED STATES PATENT AND TRADEMARK OFFICE

CERTIFICATE OF CORRECTION

PATENT NO. : 5,853,875

DATED : December 29, 1998

INVENTOR(S) : YOMISHI TOSHIDA ET AL.

It is certified that error appears in the above-identified patent and that said Letters Patent is hereby corrected as shown below:

COLUMN 27

Line 19, "by" should be deleted.
Line 53, "some" should read --come--.

COLUMN 29

Line 16, ", said metal selected" should read --, wherein said metal is selected--.
Line 17, "and the metal" should be deleted.
Line 22, "said the" should read --the--.

Signed and Sealed this

Eleventh Day of January, 2000

Attest:

Q. TODD DICKINSON

*Attesting Officer*

*Acting Commissioner of Patents and Trademarks*